Jan. 27, 1959 A. BASHOVER 2,870,571
DOLL EYE
Filed April 25, 1956
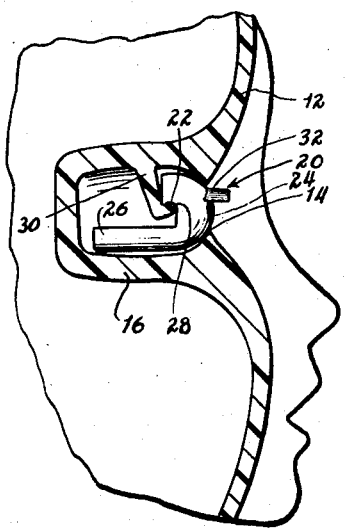
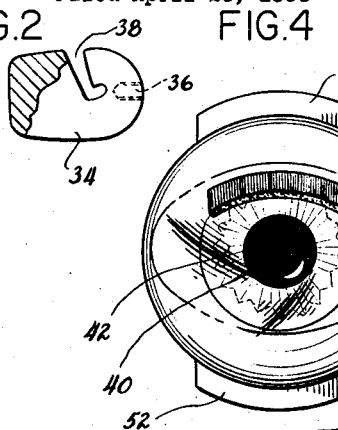
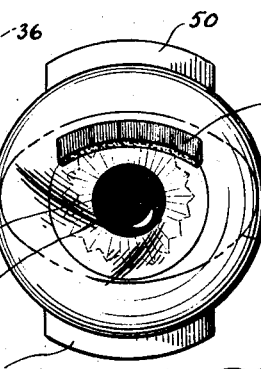
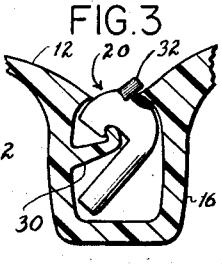
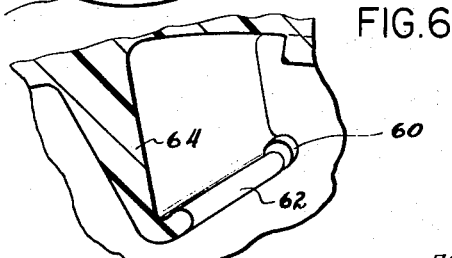
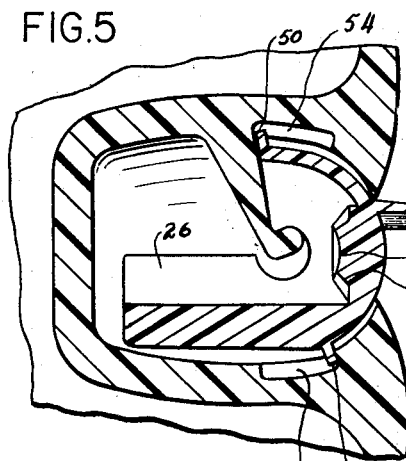
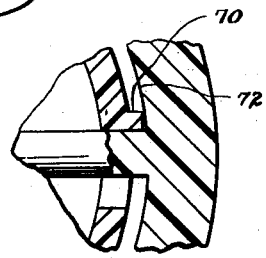
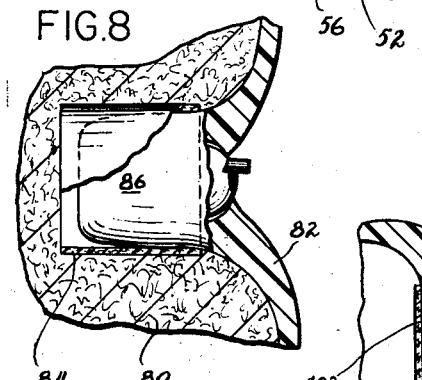
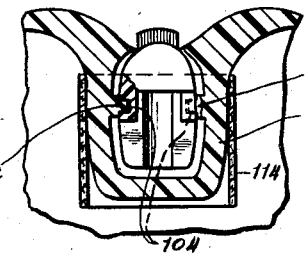
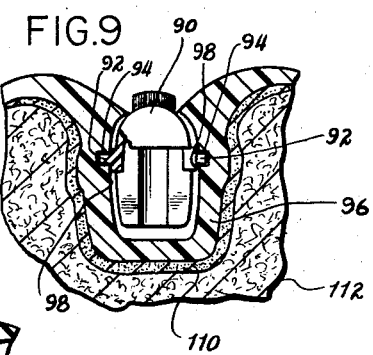
INVENTOR.
ALBERT BASHOVER
BY James and Franklin
ATTORNEYS

United States Patent Office 2,870,571
Patented Jan. 27, 1959

2,870,571

DOLL EYE

Albert Bashover, Livingston, N. J., assignor to Margon Corporation, Newark, N. J., a corporation of New Jersey Application April 25, 1956, Serial No. 580,598

5 Claims. (Cl. 46—169)

This invention relates to dolls, especially small dolls with flexible heads, and more particularly to movable or sleeping eyes therefor.

Rigid doll heads have been provided with movable eyes connected together and to a common weight arm. That construction has been carried down from large dolls to very tiny dolls. There has been a more recent trend to the use of flexible rubber-like doll heads, particularly heads made by slush molding of vinyl compound slurries, because that process is inexpensive, uses inexpensive molds, and results in one-piece heads of fine detail and having a soft skin-like texture. A suitable fibrous filling material may be used to help support the flexible head. Such heads have led to the use of substantially enclosed eye sockets molded integrally with the head, each socket receiving an individual rigid housing carrying an eye and weight. A recent example is shown in U. S. patent to Wolfe et al., 2,696,064, granted December 7, 1954, and entitled "Eye Assembly for Use in Dolls' Heads."

The housing of the eye assembly there disclosed encloses the eye except for an elliptical opening conforming to and acting as the eye opening of the head. The enclosure around the eye and its weight was deemed essential in order to maintain clearance for free movement of the eye and weight, for the material of the doll head and socket is soft and flexible and would not itself assure maintenance of the desired clearance around the weight and the eye.

Although such eye assemblies have proved successful in flexible heads of large and medium size, they are not satisfactory for use in miniature flexible heads. In a very small doll the eyes become recessed or deeply set within the head because the eye must be set back of the housing, which in turn is set back of the eye opening in the head, and the distances for clearance and for thicknesses of material, which are relatively small and tolerable in large and medium size heads, become relatively excessive in a miniature head. Moreover, in a miniature doll the cost factor becomes increasingly important, and eye assemblies with a rigid housing are expensive.

The primary object of the present invention is to generally improve doll eyes. A more particular object is to overcome the foregoing difficulties, and to provide a doll and doll eye construction suitable for miniature flexible heads. A still more particular object is to provide a doll and doll eye construction which does not require a rigid housing around the eye and weight or between the material of the head and the eye.

To accomplish the foregoing general objects, and other more specific objects which will hereinafter appear, my invention resides in the doll head and eye elements, and their relation one to another, as are hereinafter more particularly described in the following specification. The specification is accompanied by a drawing, in which:

Fig. 1 is a fragmentary vertical section through a doll head at one of the eyes;

Fig. 2 is a partially sectioned side elevation of a plug used as a part of the mold when molding the doll head;

Fig. 3 is a fragmentary section like Fig. 1, but showing the head in sleeping position;

Fig. 4 is a front view of a modified eye member embodying features of my invention;

Fig. 5 is a vertical section through a doll head, taken at an eye member of the modified type shown in Fig. 4;

Fig. 6 is a partially sectioned perspective view of a modified socket at the fulcrum and hanger;

Fig. 7 is a fragmentary section explanatory of another modification;

Fig. 8 is a vertical section like Fig. 1, but showing how the socket may be stiffened against outside pressure;

Fig. 9 is a horizontal section through an eye member showing a modification; and Fig. 10 is a horizontal section showing still another modification of the invention.

Referring to the drawing, and more particularly to Fig. 1, I there show a doll head 12 made of a flexible material and having an eye opening at 14 and a substantially enclosed eye socket 16 within the head behind the eye opening 14, for receiving an eye member generally designated 20. The socket 16 has pivot means 22 formed integrally therewith. The eye member 20 comprises an approximately hemispherical eye portion 24 and a weight portion 26. The eye member is shaped to form pivot means 28 mating with the aforesaid pivot means 22 to pivot the eye member 20 in the socket 16.

Considering the arrangement in somewhat greater detail, the pivot means 22 is preferably a fulcrum bar, and it is preferably supported at the lower end of a hanger 30. The fulcrum bar 22 and hanger 30 extend across the upper half of the socket and act as a cross brace for the socket. The pivot means of the eye member in such case is preferably formed by shaping the back of the eye portion 24 to form an inverted hook-shaped bearing which fits over and rests on the fulcrum bar 22.

The eye portion 24 is preferably approximately hemispherical, and the weight portion 26 is preferably approximately hemi-cylindrical and extends rearwardly from the lower half of the eye portion. The hook-shaped bearing 28 is located above the forward end of the weight portion 26. The axis of the pivotal action afforded by the mutual cooperation of the fulcrum bar 22, and the hook-shaped bearing 28, is located at the center of the spherical surface of the eye portion 24. It will also be observed that the hanger 30 is disposed behind the eye portion 24 and above the weight portion 26 in such a position as not to interfere with opening and closing movement of the eye member. This will be evident from inspection of Fig. 3, in which the head 12 is shown turned about 90° to supine or sleeping position. The eye member 20 has changed from open to sleeping position. The motion of the eye member may be limited in any desired fashion, as by the provision of special stop means, but in the present case a simulated lash 32 is provided, and this acts to limit both the opening and closing movements of the eye member, as will be evident from comparison of Figs. 1 and 3.

The head 12 is preferably soft and flexible or rubber-like. Indeed it may be molded of rubber, but in recent years these heads have een made by slush molding of vinyl compound slurries. Such a molding operation requires only an outside mold, and the head may be molded in one piece and subsequently pulled from the mold through the neck opening. The eye socket 16 is provided during the molding operation, and for this purpose the mold is provided with cores or so-called "plugs," which provide the eye opening 14 and the socket 16. The material is sufficiently flexible to be pulled from the plugs as the head is pulled out from the mold.

One of the plugs is shown at 34 in Fig. 2. It is secured to the mold by means of a screw received in a threaded hole 36 and brazed into place. The plug 34 is transversely slotted at 38 to produce the hanger 30 and fulcrum bar 22 which were previously referred to.

It will be noted that the material of the head is thickened at the front of the eye socket, and that the wall of the eye socket may be, and preferably is, thicker than the wall of the head. This is readily accomplished when dealing with doll heads of miniature size, for the molding compound or slurry tends to adhere more quickly around a projection or in a crevice. It forms a fillet where the plug joins the mold. In the miniature doll sizes here contemplated this results in the socket being somewhat stiff, despite the flexible nature of the head wall elsewhere, and the socket here is additionally stiffened by the action of hanger 30 and fulcrum bar 22 acting as a strut or brace extending across the eye socket. As an example of the invention, the specific head shown is about 1½" in diameter and 2" in height. The eye opening is about ⅜₁₆" high and ⅝₁₆" wide.

The eye member preferably comprises a pupil portion 40 (Figs. 4 and 5) which is smooth at the back, and an iris portion 42 which is radially serrated or otherwise roughened at the back for light reflection, in addition to the lash portion 32 which projects at the front over the iris portion 42. All of these parts, including also the weight portion 26, are preferably made of a single body of transparent plastics material which is slightly tinted for iris color. The lash portion 32 preferably has lines or ridges extending in fore-and-aft direction, to better simulate the individual hairs of an eyelash, and the lash portion may be coated to darken the same. The portion of the eye member above the lash is preferably coated with a flesh color, and the portion of the eye member below the lash and outside the iris 42 is coated with white. The hemi-cylindrical weight portion 26 has a trough or groove extending in fore-and-aft direction at the top and leading to the pupil 40 and iris 42. This facilitates the molding of the pupil and iris.

In the above respects the eye of Fig. 1 is the same as Figs. 4 and 5. However, Figs. 4 and 5 illustrate a modified eye in which the eye portion is provided with a stop ledge 50 at the top, and a stop ledge 52 at the bottom. These are received in recesses or pockets 54 and 56 respectively (Fig. 5). The ledges or flanges 50 and 52 may serve several purposes. One is to help prevent pulling of the eye member out of the eye opening. Another is to act as a motion limiting stop to control the angle of movement of the eye. For this purpose either the flange 50 or 52 will alone serve, and when such a stop flange is used the lash may be omitted insofar as its motion limiting function is concerned. It still may be wanted for appearance.

If desired, clearance may be provided at the sides of the eye member to reduce frictional resistance to turning of the eye. For this purpose spacers may be provided either at the ends of the fulcrum bar, or at the sides of the eye member. In Fig. 6 a spacer 60 is provided at the end of fulcrum bar 62 and its hanger 64. A similar spacer is provided at the other end (not shown) of the fulcrum bar 62. The eye member is received on the fulcrum bar between the two spacers.

Fig. 7 shows how the spacer may be provided at the side of the eye, and in this case the spacer 70 is formed as a part of the eye, and bears against the inside wall 72 of the eye socket.

When flexible heads are made in somewhat larger size the head usually is stuffed with a loose filler material, such as that shown at 80 in the head 82 of Fig. 8. Stuffing the head through the neck opening may tend to somewhat deform the eye sockets, and thus interfere with satisfactory operation of the eyes. To prevent this the eye sockets may be stiffened or reinforced on the outside of the socket, inside the head. In Fig. 8 I show how an approximately cylindrical member 84, which may be a piece of cardboard tube, or other tube, or a cup made of cardboard or other material, is slid frictionally over the outside of the eye socket 86, before the head 82 is stuffed. It will be evident that this protects the eye socket against deformation caused by the stuffing material 80.

It is not essential to employ a fulcrum bar and a hanger which extends entirely across the eye socket, although that is believed preferable. Instead ordinary trunnions and bearings may be provided, and in Fig. 9 I show a modification of the invention in which the eye member 90 has outwardly projecting trunnions 92 formed integrally therewith. These are received in bearings 94 formed in the side walls of the eye socket 96. Anti-friction spacers may be provided by stepping the trunnions 92 to somewhat larger diameter at the side wall of the eye, as is indicated at 98.

In Fig. 10 I show the socket wall 100 provided with inwardly directed trunnions 102, and these are received in mating recesses or bearings 104 formed in the eye member. The trunnions may be stepped or enlarged in diameter immediately adjacent the wall of the socket 100 to reduce frictional resistance to turning of the eye.

It will be understood that in either the arrangement of Fig. 9 or Fig. 10 the sides of the socket are yieldable and spread to permit the bearings to receive the trunnions. The necessary yield or spread is no greater, and indeed may be considerably less, than that needed when inserting the eye in the eye socket in the first place. In that connection it will be understood that the eye opening is prfeerably stretched or expanded by means of a suitable tool or fixture when the eye is dropped into position, and this is true of all forms of the invention shown.

When using short trunnions and bearings as shown in Figs. 9 and 10, in contrast with the diametrical fulcrum bar shown in Figs. 1 through 8, it is of increased importance to guard against deformation of the eye socket. This may be done by stiffening the same on the outside (inside the head), as previously described in connection with Fig. 8. In Fig. 9 another way to accomplish this is shown. In this case the outside of the socket (that is, the inside of the head at the socket) is coated with a quick drying cement or lacquer-like material which dries hard, as shown at 110 in Fig. 9. The eyes are first mounted in the head. The inside of the head at the sockets is then coated with the stiffening material 110. After the stiffening material has dried the head may be filled or stuffed through the neck with a filling material 112. In miniature sizes the filling material 112 may be unnecessary, and yet the stiffening material 110 may be used if desired.

In Fig. 10 the socket 100 is shown stiffened by a cylindrical sleeve or tube 114, much as was described in connection with Fig. 8. This is added after insertion of the eye in the socket.

It is believed that the construction and method of use, as well as the advantages of my improved doll and eye assembly, will be apparent from the foregoing detailed description. The invention may be used in soft doll heads, particularly in miniature size. Excessive deep seating of the eyes is avoided. The need for a housing around the eye member and forming a part of the eye assembly is completely eliminated, and instead the eye is received directly in the head socket. The socket, although made of flexible material, is sufficiently stiffened by a number of factors. A principal one is the transverse bracing effect of the fulcrum bar and hanger. Another is the increased thickness of the socket and the head wall immediately around the eye openings. If desired, and particularly if the head is to be filled with stuffing material, as when dealing with a larger head size, the socket may be stiffened around the outside (inside the head) by stiffening means applied around the outside of the socket after the eye has been inserted in the socket.

It will be understood that while I have shown and described my invention in several preferred forms, changes may be made in the structures shown, without departing

I claim:

1. In combination, a doll head and an eye member, said doll head being made of a flexible material and having an eye opening and a substantially enclosed eye socket within the head behind said eye opening receiving the aforesaid eye member, said socket having a fulcrum bar which extends across the socket, said eye member comprising an approximately hemispherical eye portion and a weight portion extending rearwardly of the eye portion, the back of said eye portion being shaped to form an inverted hook-shaped bearing, said hook-shaped bearing being open to the rear and received over said fulcrum bar to pivot the eye member in the socket, said bar being disposed so as not to interfere with opening and closing movement of the eye member, and the socket constituting the sole enclosure for said eye member.

2. In combination, a doll head and an eye member, said doll head being made of a flexible material and having an eye opening and a substantially enclosed eye socket within the head behind said eye opening receiving the aforesaid eye member, said socket having a fulcrum bar and a hanger for said fulcrum bar which extends across the upper half of the socket and acts as a cross brace for said socket, said eye member comprising an approximately hemi-spherical eye portion and a weight portion extending rearwardly from the lower half of the eye portion, the back of said eye portion being shaped to form an inverted hook-shaped bearing, said hook-shaped bearing being open to the rear and received over said fulcrum bar to pivot the eye member in the socket, and said hanger being disposed behind the eye portion and above the weight portion in such position as not to interfere with opening and closing movement of the eye member, said eye socket constituting the sole enclosure for said eye member.

3. In combination, a doll head and an eye member, said doll head being made of a flexible material and having an eye opening and a substantially enclosed eye socket within the head behind said eye opening receiving the aforesaid eye member, said socket having a fulcrum bar and a hanger for said fulcrum bar which extends across the upper half of the socket and acts as a cross brace for said socket, said fulcrum bar and hanger being integral with said socket, said eye member comprising an approximately hemi-spherical eye portion and an approximately hemi-cylindrical weight portion extending rearwardly from the lower half of the eye portion, the back of said eye portion being shaped to form an inverted hook-shaped bearing, said hook-shaped bearing being received over said fulcrum bar to pivot the eye member in the socket, and said hanger being disposed behind the eye portion and above the weight portion in such position as not to interfere with opening and closing movement of the eye member.

4. A doll head for use with individual movable doll eyes, said doll head being made of a flexible material and having eye openings and substantially enclosed eye sockets within the head behind said eye openings for receiving the eye members, each socket having a fulcrum bar and a hanger for said fulcrum bar which extends across the upper half of the socket and acts as a cross brace for said socket, while said fulcrum bar acts to pivot the eye member for opening and closing movement.

5. In combination, a doll head and an eye member, said doll head being made of a flexible material and having an eye opening and a substantially enclosed eye socket within the head behind said eye opening receiving the aforesaid eye member, said socket having a fulcrum bar which extends across the socket, said eye member comprising an approximately hemispherical eye portion and a weight portion extending rearwardly of the eye portion, the back of said eye portion being shaped to form an inverted hook-shaped bearing, said hook-shaped bearing being open to the rear and received over said fulcrum bar to pivot the eye member in the socket, said bar being disposed so as not to interfere with opening and closing movement of the eye member, the socket constituting the sole enclosure for said eye member, and stiffening means over the outside of the eye socket inside the head to help stiffen the socket.

References Cited in the file of this patent

UNITED STATES PATENTS

| | | |
|---|---|---|
| 974,953 | Darlinton | Nov. 8, 1910 |
| 1,071,950 | Paddock | Sept. 2, 1913 |
| 2,017,102 | Mayhew | Oct. 15, 1935 |
| 2,667,013 | Tommarchi et al. | Jan. 26, 1954 |

FOREIGN PATENTS

| | | |
|---|---|---|
| 634,266 | Great Britain | Mar. 15, 1950 |